S. Darling,
Inkstand.

No. 4197. Reissued Dec. 13. 1870.

Witnesses
W. Bradford,
J. H. Beale,

Samuel Darling
Inventor
by Crosby, Halsted & Gould
his Attorneys.

United States Patent Office.

SAMUEL DARLING, OF PROVIDENCE, RHODE ISLAND.

Letters Patent No. 51,931, dated January 9, 1866; reissue No. 4,197, dated December 13, 1870.

IMPROVEMENT IN INKSTANDS.

The Schedule referred to in these Letters Patent and making part of the same.

*To all persons to whom these presents shall come:*

Be it known that I, SAMUEL DARLING, formerly of Bangor, Maine, but now of the city of Providence, in the State of Rhode Island, have made certain new and useful Improvements in Ink-stands; and I do hereby declare the same to be fully described in the following specification and illustrated in the accompanying drawing, in which—

Figure 1 is a top view;

Figure 2, a side elevation, showing the cover, as raised; and

Figure 3, a longitudinal section of an inkstand constructed in accordance with my invention, this latter section being taken through the dipping-cup and its vent-hole.

The nature of my improvements consists—

Figure 1:
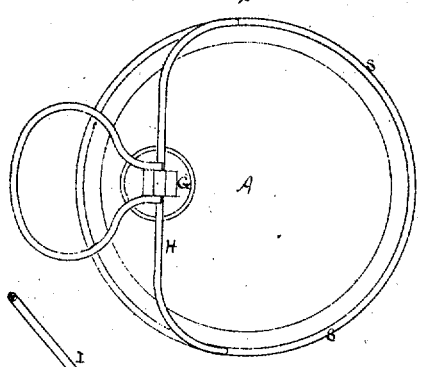
Figure 2:
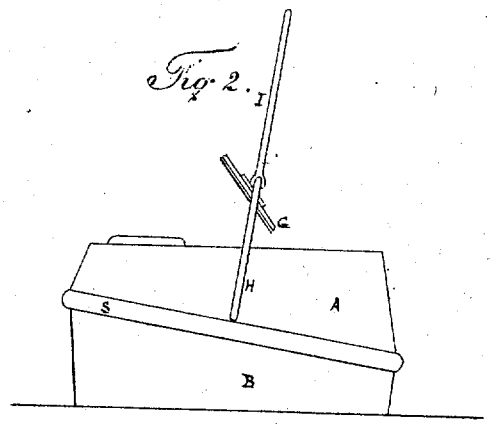

First, in an inkstand having a reservoir arranged so as to be capable of being rotated upon its bed or stand, and having a pen-dipping cup on one side of its center of rotation, when the ink is caused to be at the proper height in the dipping-cup by revolving the reservoir; and Second, in an inkstand having a dipping-cup, the lower part of which is smaller than the breadth of a pen, and having also an ink-containing cavity or recess in the bottom of the reservoir located under the dipping-cup, all as hereinafter more fully set forth.

In carrying out my invention I construct the body-portion of my inkstand in two parts, as follows:

In the drawing—

A denotes the upper, and B, the lower portion of the inkstand, each portion being of a frusto-conical (or other proper) shape, the plane of the bottom of part A and the plane of the top of part B being, when the parts are in place for use, equally inclined to the horizon.

For the purpose of hiding the joint between the said parts, a rim or bead, *s*, may be formed around either of the said upper or lower portions.

Figure 3:
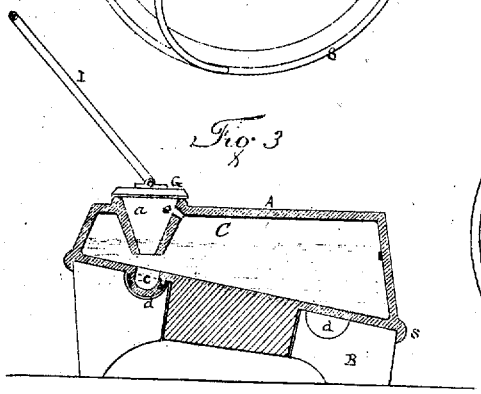

The part A is made hollow, or is chambered, so as constitute a fountain or reservoir, C, for the ink, such fountain increasing in depth from its front to its rear part, as seen in fig. 3, and being provided with a bottomless pen-passage or dipping-cup, *a*, leading upward from the same. This dipping-cup tapers downward, as shown, and the opening at its lower part is made less in diameter than a pen, so that, whilst the tip or nib of the pen may project below it, yet the thicker part of the pen will positively arrest or limit its downward movement.

Figure 4:
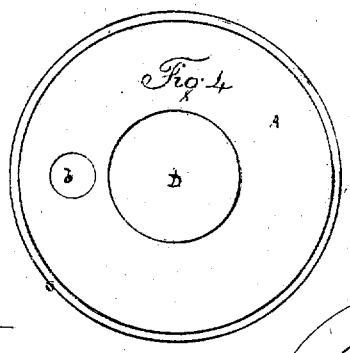
Figure 4 is on under side view of the fountain or upper portion of the inkstand.

A cavity or recess, *c*, is made in a nipple or projection, *b*, which extends downward from the lower face of the part A, as shown in figs. 3 and 4. This cavity or chamber is located directly underneath the dipping-cup, which is of a hollow frusto-conical shape, and projects downward from the top of the reservoir into which it opens, as seen.

The object of making this chamber *c* directly below the pen or dipping-cup *a*, in connection with the small diameter given to the opening at the bottom of such cup, is to prevent injury to the point or nib of the pen while being thrust into the cup, as well as to receive any sediment which may be deposited or thrown down from the ink.

Figure 5:
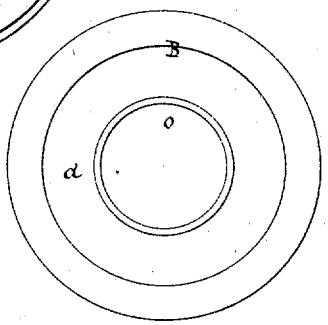
Figure 5 is a top view of the lower portion of said stand.
Figure 6:
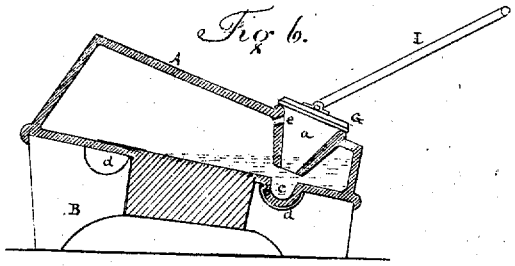
Figure 6 is a longitudinal section, taken when the ink is low and the ink-fountain has been turned around about one hundred and eighty degrees from the position shown in fig. 3.

D is another cylindrical projection or pin, projecting axially downward from the lower face of the fountain or upper portion A, and entering a hole or socket, O, formed through the part B, as seen in fig. 5.

The said pin serves to connect the two portions A and B, and at the same time to allow either of the said parts to be freely rotated.

In the upper surface of the said part B an annular groove or channel is formed, such being for the reception of the projection *b*, containing the sediment-chamber *c*, hereinbefore mentioned, and for allowing such projection to be moved throughout such groove during an entire revolution of the part A on the part B.

*e* is a vent-hole, which opens out of the upper part of the dipping-cup, and communicates with the interior of the ink fountain.

The object of this vent-hole is two-fold: First, to prevent any expansion of the air in the fountain from causing an overflow of ink; and Second, to allow the air to escape from the fountain while the latter is being filled with ink.

For the purpose of preventing as far as possible any evaporation of the ink contained within the fountain, and to preclude the admission of dust or other foreign matter into the dipping or pen-cup, I provide such cup with a self-adjusting and self-closing valve or cover, G, which I suspend from the central part of a curved wire or bail, H, the two extremities of such bail being jointed or pivoted to opposite sides of the part A, as shown in fig. 1.

This valve or cover should be so hinged or jointed to the bail that, whenever the hand of a person, after having effected the elevation of the bail so as to raise the cover off the mouth of the inkstand, may have been withdrawn from the arm I of the bail, the gravitating power of the bail, and its arm and the cover shall cause them to descend and the cover to close the said mouth. The lever or arm I is soldered or fastened to the bail H, near its central part, and extends upward therefrom, as seen in fig. 1. This arm or lever should be of such form and so arranged that it may be conveniently and readily met by the hand of a person while in the act of being moved toward the inkstand for the purpose of inserting a pen therein; the pressure of the hand against the arm serving, under such circumstances, to raise the bail and its cover so as to open the mouth of the inkstand for the introduction of the pen therein. During the act of withdrawing the pen and hand from the inkstand, the bail and cover will descend so as to carry the cover on and cause it to close the mouth.

When the inkstand is to be charged with ink, the fountain or part A is to be turned until the top surface thereof shall stand in a horizontal plane. The ink is next to be poured into the fountain until it shall become full enough which will be indicated by its standing at the desired height in the dipping-cup. This having been done, all that is requisite to maintain the ink at the required level in the dipping-cup as its quantity diminishes, is to simply turn the part A from time to time upon its fellow B, as circumstances may require.

From the above it will be seen that my improved inkstand is not only simple in construction, and capable of being readily charged with ink, but such ink can easily be maintained at the desired height in the dipping-cup, notwithstanding the quantity in the reservoir may be steadily diminishing, thus insuring that the pen shall always take up a proper supply, but never an over supply, while at the same time the ink in the reservoir is most effectually protected from dust or other foreign matters.

I do not claim an inkstand made with its ink-holder and its base applied together with inclined surfaces and a pivot at the junction; nor do I claim the arrangement and combination of a bow-lever with a cover hinged directly to the pen part, ring, or cap of an inkstand, the same being as represented in the United States Patent No. 13,515; but

What I claim as my improvement or invention is as follows:

1. An inkstand, having a reservoir arranged to be rotated upon its bed or stand, and having a dipping-cup on one side of its center of rotation, when the ink is caused to be at the proper height in the dipping-cup by revolving the reservoir, substantially as described.

2. An inkstand, having a dipping-cup, the lower part of which is smaller than a pen, and having also an ink-containing cavity or recess in the bottom of the reservoir, under the dipping-cup, substantially as and for the purpose described.

SAMUEL DARLING.

Witnesses:
W. H. GREENE,
H. J. SPOONER.